United States Patent
Duchateau et al.

(10) Patent No.: US 10,550,254 B2
(45) Date of Patent: Feb. 4, 2020

(54) HETEROPHASIC POLYPROPYLENE

(71) Applicant: SABIC Global Technologies B.V., Bergen op Zoom (NL)

(72) Inventors: Robbert Duchateau, Eindhoven (NL); Jelle Terpsma, Geleen (NL); Henrica Norberta Alberta Maria Steenbakkers-Menting, Susteren (NL); Lidia Jasinska-Walc, Eindhoven (NL); Miloud Bouyahyi, Eindhoven (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 177 days.

(21) Appl. No.: 15/576,341

(22) PCT Filed: May 18, 2016

(86) PCT No.: PCT/EP2016/061115
§ 371 (c)(1),
(2) Date: Nov. 22, 2017

(87) PCT Pub. No.: WO2016/198243
PCT Pub. Date: Dec. 15, 2016

(65) Prior Publication Data
US 2018/0148571 A1 May 31, 2018

(30) Foreign Application Priority Data
May 22, 2015 (EP) ..................... 15169058

(51) Int. Cl.
*C08L 23/12* (2006.01)
*C08L 23/06* (2006.01)

(52) U.S. Cl.
CPC .............. *C08L 23/12* (2013.01); *C08L 23/06* (2013.01); *C08L 2203/18* (2013.01); *C08L 2205/02* (2013.01); *C08L 2205/03* (2013.01); *C08L 2205/08* (2013.01); *C08L 2207/02* (2013.01)

(58) Field of Classification Search
CPC ...... C08L 23/12; C08L 23/06; C08L 2207/02; C08L 2205/02; C08L 2205/08; C08L 2203/18; C08L 2207/18
See application file for complete search history.

(56) References Cited

U.S. PATENT DOCUMENTS

| | | |
|---|---|---|
| 5,693,710 A | 12/1997 | Srinivasan et al. |
| 6,114,443 A | 9/2000 | Lohse et al. |
| 2007/0254119 A1 | 11/2007 | Lloyd-George et al. |
| 2017/0349710 A1 | 12/2017 | Jasinska-Walc et al. |
| 2018/0016428 A1* | 1/2018 | Glenister ............... C08L 23/12 |
| 2018/0163035 A1 | 6/2018 | Duchateau et al. |
| 2018/0319966 A1* | 11/2018 | Lu ........................... C08L 23/12 |

FOREIGN PATENT DOCUMENTS

| | | |
|---|---|---|
| DE | 102005025017 A1 | 12/2006 |
| EP | 3015503 A1 | 5/2016 |
| EP | 3034547 A1 | 6/2016 |
| WO | 2012065711 A1 | 5/2012 |
| WO | 2014147546 A1 | 9/2014 |
| WO | 2014188344 A1 | 11/2014 |
| WO | 2014203209 A1 | 12/2014 |
| WO | WO 2014/203209 A1 * 12/2014 ............. C08G 63/00 |
| WO | 2016188817 A1 | 12/2016 |

OTHER PUBLICATIONS

Becquart et al., "Poly[ethylene-co-(vinyl alcohol)]-graft-poly-(e-caprolactone) Synthesis by Reactive Extrusion, 1-Structural and Kinetic Study" Macromol. Mater. Eng. 2009, 294, 643-650.
Bisht et al., "Enzyme-Catalyzed Ring-Opening Polymerization of ω-Pentadecalactone," Macromolecules 1997, 30, 2705-2711.
Bouyahyi et al., "Metal-Based Catalysts for Controlled Ring-Opening Polymerization of Macrolactones: High Molecular Weight and Well-Defined Copolymer Architectures," Macromolecules 2014, 47, 517-524.
Bouyahyi et al., "ω-Pentadecalactone Polymerization and ω-Pentadecalactone/ε-Caprolactone Copolymerization Reactions Using Organic Catalysts," Macromolecules 2012, 45, 3356-3366.
Fokou et al., "Studying and Suppressing Olefin Isomerization Side Reactions During ADMET Polymerizations," Macromol. Rapid Commun. 2010, 31, 368-373.
Hunsen et al., "Humicola insolens Cutinase-Catalyzed Lactone Ring-Opening Polymerizations: Kinetic and Mechanistic Studies," Biomacromolecules 2008, 9, 518-522.
Yang et al., "Two-Step Biocatalytic Route to Biobased Functional Polyesters from ω-Carboxy Fatty Acids and Diols," Biomacromolecules 2010, 11, 259-268.
International Search Report for International Application No. PCT/EP2016/061115; International Filing Date: May 18, 2016; dated Aug. 6, 2016; 5 Pages.
Jasinska-Walc et al., "Topical behavior mimicking ethylene-hexene copolymers using branched lactones and macrolactones," Polym. Chem., 2014, 5, 3306.
Jedlinski et al., "Anionic polymerization of pentadecanolide. A new route to a potentially biodegradable aliphatic polyester", Macromol. Chem. Phys. 197,2923-2929 (1996).

(Continued)

*Primary Examiner* — Robert D Harlan
(74) *Attorney, Agent, or Firm* — Cantor Colburn LLP

(57) ABSTRACT

The present invention relates to a composition comprising: a heterophasic polypropylene containing i) a matrix phase of a propylene homopolymer and/or a propylene copolymer with up to 3 wt. % of ethylene and/or at least one $C_4$-$C_8$ α-olefin, the wt. % based on the weight of the copolymer and ii) a disperse phase of an ethylene-$C_3$-$C_8$ α-olefin copolymer, wherein the ethylene content is at least 40 wt. % based on the weight of the ethylene-$C_3$-$C_8$ α-olefin copolymer, one or more of a compatibilizer, wherein the compatibilizer is i) a non-aromatic polyester having an average M/E ratio of at least 10 and/or ii) a block copolymer comprising a polypropylene block and a polyester block, said polyester being a non-aromatic polyester and having an average M/E ratio of at least 10, wherein M is the number of backbone carbon atoms in the polyester, not including the carbonyl carbons and E is the number of ester groups in the polyester.

15 Claims, 2 Drawing Sheets

(56) References Cited

OTHER PUBLICATIONS

Kumar et al., "Efficient Ring-Opening Polymerization and Copolymerization of ε-Caprolactone and ω-Pentadecalactone Catalyzed by Candida antartica Lipase B," Macromolecules 2000, 33, 6303-6309.

Liu et al., "Polymers from Fatty Acids: Poly(ω-hydroxyl tetradecanoic acid) Synthesis and Physico-Mechnical Studies" Biomacromolecules 2011, 12, 3291-3298.

Machine Translation of DE102005025017; Date of Publication: Dec. 7, 2006; 26 Pages.

Mahapatro et al., "Mild, Solvent-Free ω-Hydroxy Acid Polycondensations Catalyzed by Candida antarctica Lipase B," Biomacromolecules 2004, 5, 62-68.

Mu et al., "Synthesis of Amphiphilic Linear-Hyperbranched Graft-Copolymers via Grafting Based on Linear Polyethylene Backbone," Journal of Polymer Science, Part A: Polymer Chemistry 2014, 52, 2146-2154.

Pepels et al., "From Polyethylene to Polyeseter: Influence of Ester Groups on the Physical Properties," Macromolecules 2013, 46, 7668-7677.

Pillai et al., Tailored Nanostructuring of End-Group-Functionalized High-Density Polyethylene Synthesized by an Efficient Catalytic Version of Ziegler's "Aufbaureaktion" Chem. Eur. J. 2012, 18, 13974-13978.

Tzeng et al., "Stereoregular Diblock Copolymers of Syndiotactic Polypropylene and Polyesters: Syntheses and Self-Assembled Nanostructures" Macromolecules 2009, 72, 3073-3085.

van der Meulen et al., "Catalytic Ring-Opening Polymerization of Renewable Macrolactones to High Molecular Weight Polyethylene-like Polymers," Macromolecules 2011, 44, 4301-4305.

Vilela et al., "Plant Oil-Based Long-Chain C26 Monomers and Their Polymers," Macromol. Chem. Phys. 2012, 213, 2220-2227.

Wilson et al., "'Immortal' ring-opening polymerization of ω-pentadecalactone by Mg(BHT)2(THF)2," Polym. Chem., 2014, 5, 2691.

Wilson et al., "Synthesis of ω-Pentadecalactone Copolymers with Independently Tunable Thermal and Degradation Behavior," Macromolecules 2015, 48, 950-958.

Written Opinion of the International Searching Authority for International Application No. PCT/EP2016/061115; Filing Date: May 18, 2016; dated Aug. 6, 2016; 5 Pages.

* cited by examiner

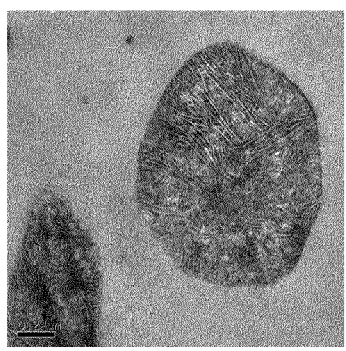
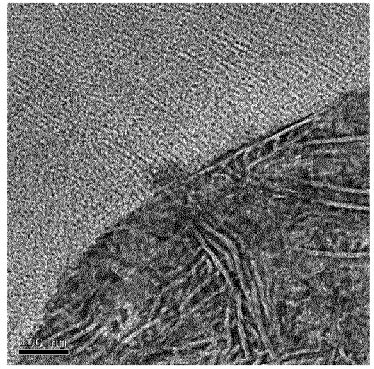
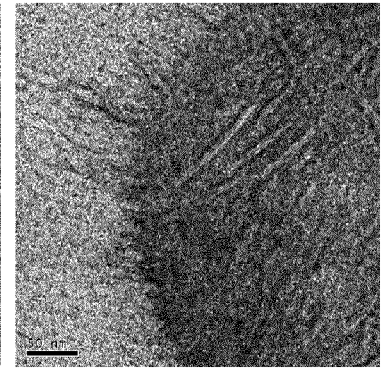
Fig. 1a　　　　　　　　Fig. 1b　　　　　　　　Fig. 1c
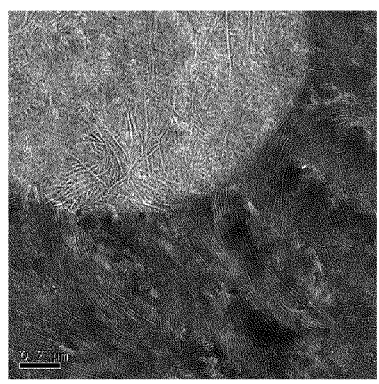
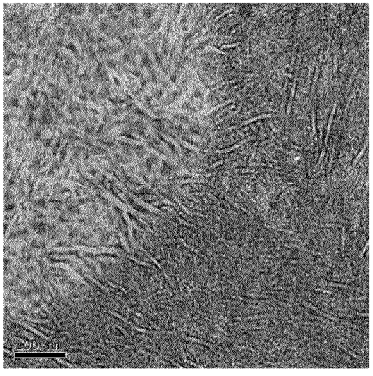
Fig. 2a　　　　　　　　Fig. 2b　　　　　　　　Fig. 2c
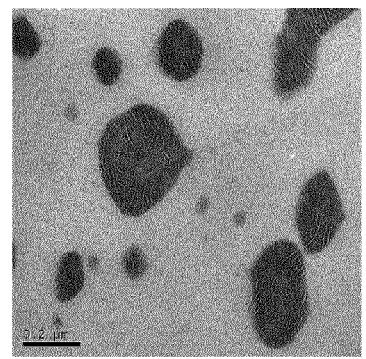
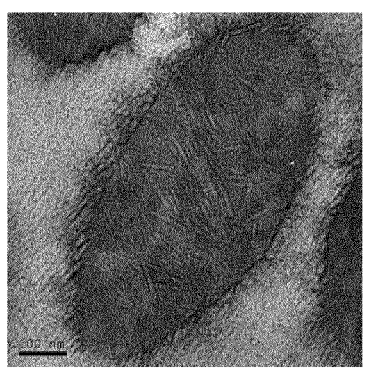
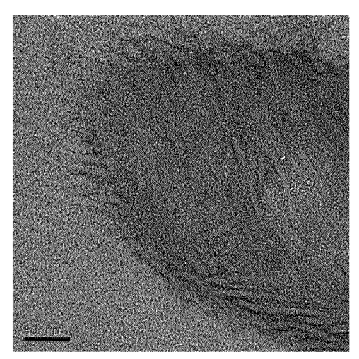
Fig. 3a　　　　　　　　Fig. 3b　　　　　　　　Fig. 3c

HETEROPHASIC POLYPROPYLENE

CROSS REFERENCE TO RELATED APPLICATIONS

This application is a 371 of International Application No. PCT/EP2016/061115, filed May 18, 2016, which claims priority to European Application No. 15169058.3, filed May 22, 2015 which are incorporated herein by reference in their entirety.

The present invention relates to a composition comprising a heterophasic polypropylene. Such compositions are well known and widely used for many applications, including automotive interior and exterior applications as well as appliances and pipes.

Heterophasic polypropylene is a material consisting of two phases generally referred to as a matrix phase and a disperse phase. The matrix phase is usually a propylene homopolymer or a propylene copolymer with a relatively low amount of comonomer. The matrix of the material generally provides for stiffness of the material. The disperse phase usually consists of a rubber or rubber like material. The disperse phase increases the impact properties of the material yet at the expense of stiffness. Accordingly by varying the amount and type of disperse phase the stiffness and impact properties can be balanced to a desired level. If needed further stiffness enhancing additives, like inorganic fillers such as talc, calcium carbonate, glass fibres, organic fibres can be added. Such compositions are well known to the skilled person.

Heterophasic polypropylene materials are generally manufactured in a multi-stage polymerisation process. In a first reactor, or a first series of reactors the polymer forming the matrix phase is prepared after which the obtained polymer is fed to a second reactor or second series of reactors for the manufacture of the polymer forming the disperse phase. Such heterophasic polypropylenes are herein referred to as reactor grade heterophasic polypropylenes.

Another method for preparing heterophasic polypropylene is to melt mix the individual components making up the matrix phase and the disperse phase. For example a propylene homopolymer may be melt-mixed with an ethylene copolymer elastomer thereby forming a heterophasic system wherein the elastomer is dispersed in the propylene homopolymer. Such heterophasic polypropylenes are herein referred to as non-reactor grade heterophasic polypropylenes.

The first method is generally preferred since inherently the bond between the disperse phase and the matrix phase is found to be stronger than the bond in a heterophasic system based on mixing of the individual components.

Nonetheless there remains a continuous need to further strengthen the bond between the matrix phase and the disperse phase of heterophasic polypropylenes.

It is an object of the present invention to provide an improved heterophasic polypropylene.

It is in particular an object of the invention to provide a heterophasic polypropylene with improved properties, in particular mechanical properties.

Accordingly the present invention relates to a composition comprising a heterophasic polypropylene containing i) a matrix phase of a propylene homopolymer and/or a propylene copolymer with up to 3 wt. % of ethylene and/or at least one $C_4$-$C_8$ α-olefin, the wt. % based on the weight of the copolymer and ii) a disperse phase of an ethylene-$C_3$-$C_8$ α-olefin copolymer, wherein the ethylene content is at least 40 wt. % based on the weight of the ethylene-$C_3$-$C_8$ α-olefin copolymer, one or more of a compatibiliser, wherein the compatibiliser is i) a non-aromatic polyester having an average M/E ratio of at least 10 and/or ii) a block copolymer comprising a polypropylene block and a polyester block, said polyester being a non-aromatic polyester and having an average M/E ratio of at least 10, wherein M is the number of backbone carbon atoms in the polyester, not including the carbonyl carbons and E is the number of ester groups in the polyester.

The present inventors have found that non-aromatic polyesters having an average M/E ratio of at least 10, wherein M is the number of backbone carbon atoms in the polyester not including the carbonyl carbons and E is the number of ester groups in the polyester, show a compatibilising effect when used in relatively low amounts in compositions comprising polypropylene and a polyethylene phase containing polyethylene crystals.

The present inventors in particular observed that these polyesters may, at least in part, co-crystallise with the crystals in the ethylene copolymer phase, and/or may crystallise epitaxially onto ethylene crystals in the ethylene copolymer phase. At least, in particular if the amount of crystals in the ethylene copolymer phase is low, the polyester will entangle with polymers of the disperse phase. The inventors also observed that the polyester shows interaction with polypropylene. In line with these observations the present inventors found that the properties of a heterophasic polypropylene can be improved by addition of a relatively small amount of the polyester as herein defined. The same observation was found for block copolymers comprising a polypropylene block and a polyester block, wherein the polypropylene block interacts with the polypropylene phase. The present inventors further found that the polyester based compatibiliser (either polyester or the polypropylene polyester block copolymer) will introduce a certain polarity in the material, such that printability or paintability is improved reducing the need or intensity of pre-treatments such as flame treatment, corona treatment or fluorine treatment.

By application of the invention the aforementioned objects is therefore met.

Heterophasic Polypropylene

The heterophasic polypropylene preferably contains from 60-95 wt. % of matrix phase and from 5-40 wt. % of disperse phase, the wt. % based on the weight of the heterophasic polypropylene. The heterophasic polypropylene may contain from 70-90 wt. % of matrix phase and from 30-10 wt. % of disperse phase.

The polypropylene of the matrix phase is preferably a propylene homopolymer.

The ethylene copolymer of the disperse phase is preferably an ethylene propylene copolymer.

It is preferred that the ethylene copolymer contains a certain crystallinity as this enhances the interaction with the polyester. Accordingly in a preferred the embodiment the ethylene copolymer of the disperse phase comprises crystalline domains.

To that extent is preferred that the ethylene content of the ethylene copolymer is at least 50 wt. %, more preferably at least 60 wt. % or at least 65 wt. % even more preferably at least 70 wt. %. The ethylene content of the ethylene copolymer is at most 90 wt. % more preferably at most 85 wt. %, the weight percentage based on the weight of the ethylene copolymer of the disperse phase.

The melt flow rate of the heterophasic polypropylene can vary and depends on the intended application. For example the melt flow rate may be from 0.1-100 g/10 min. For pipe applications the melt flow rate may be from 0.1-3 g/10 min whereas for injection moulding applications the melt flow rate may be higher and typically is in the range of from 10-80 g/10 min. The present inventors believe that the melt flow rate of the heterophasic polypropylene is of less influence to the compatibilising effect of the compatibiliser as herein disclosed.

Similarly the viscosity of the disperse phase may vary depending on the desired application. For example, the intrinsic viscosity of the xylene cold soluble fraction of the disperse phase may range from 1.0-4.0 dl/g, such as from 1.0-3.0 dl/g or 1.5-2.5 dl/g as measured according to ISO-1628-1 and -3 (decaline).

The heterophasic polypropylene is preferably a reactor grade heterophasic polypropylene. The skilled person will understand that the heterophasic polypropylene may also be a mixture of two or more (reactor grade) heterophasic polypropylenes.

Polyester Compatibiliser

The polyester in the composition according to the present invention is a non-aromatic polyester having an average M/E ratio of at least 10, wherein M is the number of backbone carbon atoms in the polyester not including the carbonyl carbons and E is the number of ester groups in the polyester. With average M/E ratio is meant a numerical average.

The polyester is non-aromatic meaning the polyester does not contain aromatic groups.

The backbone of the polyester is preferably saturated meaning it preferably does not contain any double bonds. It is preferred the backbone of the polyester is aliphatic. The polyester backbone may, in an embodiment, contain short aliphatic branches such as methyl, ethyl, propyl, butyl, pentyl or hexyl branches. The amount of such branches is preferably kept at a low amount since it may negatively affect the (co)crystallisation behaviour of the polyester block. In another embodiment the backbone contains one or more heteroatoms such as oxygen, nitrogen or sulfur. It is preferred that the backbone of the polyester is based on methylene units, i.e. that the ester groups are linked via unbranched aliphatic groups.

The polyester may be a polyester homopolymer or a polyester copolymer.

If the polyester is a polyester copolymer then the number of backbone carbon atoms between two neighbouring ester groups in the backbone is preferably randomly distributed over the polyester. Furthermore the number of backbone carbon atoms (M) between ester functionalities in polyester copolymers is preferably at least 8, more preferably at least 10, or at least 12.

Typical examples of polyester homopolymers include the homopolymers obtainable by the ring opening polymerisation of dodecalactone, tridecanolactone, tetradecalactone, pentadecalactone, hexadecalactone, heptadecalactone, octadecalactone, nonadecalactone, ambrettolide, globalide. In other words typical examples of polyester homopolymers include polydodecalactone, polytridecanolactone, polytetradecalactone, polypentadecalactone, polyhexadecalactone, polyheptadecalactone, polyoctadecalactone, polynonadecalactone, polyambrettolide, polyglobalide.

Typical examples of polyester copolymers include copolymers of at least two lactones from a group including dodecalactone, tridecanolactone, tetradecalactone, pentadecalactone, hexadecalactone, heptadecalactone, octadecalactone, nonadecalactone, ambrettolide, globalide, valerolactone, caprolactone, massoia lactone, δ-decalactone, ε-decalactone, 13-hexyloxacyclotridec10-en-2-one, 13-hexyloxacyclotridecan-2-one.

Other typical examples of polyester copolymers include AABB type copolyesters prepared of a combination of $C_2$-$C_{30}$ diols and $C_2$-$C_{32}$ diacids provided the polyester copolymer has an average M/E of at least 10. Further it is preferred that the M/E ratio for the copolymers is at least 8. The term $C_x$ refers to the total amount of carbon atoms x in the diol or diacid respectively.

Diols include, but are not limited to, ethylene glycol, propane-1,3-diol, butane-1,4-diol, pentane-1,5-diol, hexane-1,6-diol, heptane-1,7-diol, octane-1,8-diol, nonane-1,9-diol, decane-1,10-diol, undecane-1,11-diol, dodecane-1,12-diol, tridecane-1,13-diol, tetradecane-1,14-diol, epntadecane-1,15-diol, hexadecane-1,16-diol, heptadecane-1,17-diol, octadecane-1,18-diol, nonadecane-1,19-diol, icosane-1,20-diol, henicosane-1,21-diol, docosane-1,22-diol, tricosane-1,23-diol, tetracosane-1,24-diol, pentacosane-1,25-diol, hexacosane-1,26-diol, heptacosane-1,27-diol, octacosane-1,28-diol, nonacosane-1,29-diol, triacontane-1,30-diol as well as their unsaturated and branched analogues.

Diacids include, but are not limited to oxalic acid, malonic acid, succinic acid, glutaric acid, adipic acid, heptanedioic acid, octanedioic acid, nonanedioic acid, decanedioic acid, undecandedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, icosanedioic acid, henicosanedioic acid, docosanedioic acid, trocosanedioic acid, tetracosanedioic acid, pentacosanedioic acid, hexacosanedioic acid, heptacosanedioic acid, octacosanedioic acid, nonacosanedioic acid, triacontanedioic acid and their unsaturated and branched analogues. The diols and diacids might also contain a heteroatom in the main chain like an oxygen, nitrogen or sulfur, for example 1,5-dioxapan-2-one.

Cyclic carbonic acid esters can also be used as monomer or as comonomer in combination with lactones, dilactones, hydroxyl acids, hydroxyacid esters or diols plus dicarboxylic acids or a combination of these monomers to form polycarbonates or poly(ester-co-carbonate)s with an average M/E of 10 or larger. Examples of cyclic carbonic acid esters are trimethylene carbonate and decamethylene carbonate.

Instead of a combination of one or more diol and diacid, cyclic dilactones can also be added to produce AABB copolyesters with the desired M/E, which is 10 or higher. Typical examples of cyclic dilactones are: ethylene adipate, ethylene brassylate, butylene adipate.

Another type of polyester copolymers include AB/AABB copolyesters prepared of a combination of lactones and dilactones and/or the combination of $C_2$-$C_{30}$ diols and $C_2$-$C_{32}$ diacids, which result in polyesters having an average M/E of at least 10. The lactones, dilactones, diols and diacids can be selected from the lists given above.

Preferably the polyester or copolyester is selected from polytetradecalactone, polypentadecalactone, polyhexadecalactone, poly(caprolactone-co-pentadecalactone), poly(ε-decalactone-co-pentadecalactone), poly(ethylene brassylate-co-pentadecalactone), poly[ethylene-1,19-nonadecanedioate], poly[ethylene-1,23-tricosanedioate], poly[propylene-1,19-nonadecanedioate], poly[propylene-1,23-tricosanedioate], poly[1,4-butadiyl-1,19-nonadecanedioate], poly[1,4-butadiyl-1,23-tricosanedioate], poly[1,6-hexadiyl-1,19-nonadecanedioate], poly[1,6-hexadiyl-1,23-tricosanedioate], poly[1,19-nonadecadiyl-1,19-nonadecanedioate], poly[1,19-nonadecadiyl-1,23- tricosanedioate], poly[1,23-tricosadiyl-1,19-nonadecanedioate], poly[1,23-tricosadiyl-1,23-tricosanedioate], poly[1,20-icosadiyl-1,20-icosa-nedioate], poly[1,6-hexadiyl-1,20-icosenedionate], poly[propylene-1,20-icosanedionate].

More in general the polyester or copolyester is of general structure

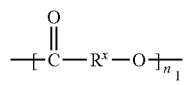

wherein
$R^x$ is an organic group, preferably an aliphatic group having an average chain length of at least 10 carbon atoms and $n_1$ is the number of repeating units, which generally is at least 25, such as at least 50, such as at least 100. Practical maximum number of repeating units can be 2000 or 1000.

Organic group $R^x$ is a branched or straight hydrocarbon group optionally containing one or more heteroatoms provided that the atom neighboring the —O— is a carbon atom, i.e. not a heteroatom. $R^x$ may contain one or more unsaturations, like —C=C—. Preferably $R^x$ is a branched or straight hydrocarbon group, more preferably $R^x$ is a branched or straight aliphatic group. $R^x$ is preferably a saturated aliphatic group. In that respect the term chain length as used herein refers to the shortest number of atoms between two ester functionalities (O=)C—O—. Hence the "chain length" does not include any optional branches or side groups. For example, if $R^x$ is ($C_4H_8$) the chain length is four. Similarly, if $R^x$ is $CH_2$—$C(CH_3)_2$—$CH_2$—$CH_2$ the chain length is also four. In the general formula above Rx may be the same or different throughout the polyester provided the average chain length is at least 10 carbon atoms. The following general (co)polyester structures can be considered, which structures are to be considered as more detailed embodiments of the general structure provided above:

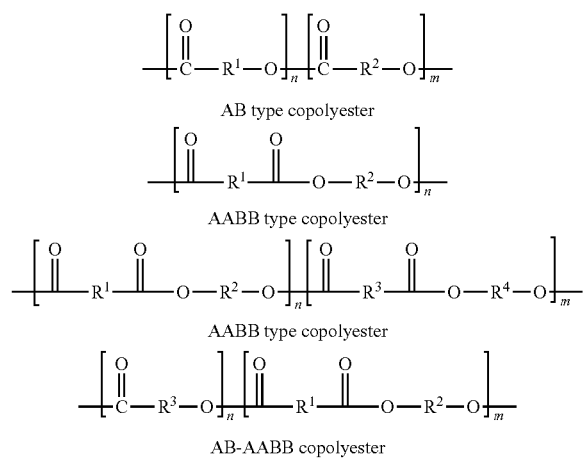

The chain lengths of $R^1$, $R^2$, $R^3$ and $R^4$ are selected such that for the polyester the M/E ratio is at least 10. The description for $R^x$ above also applies for $R^1$-$R^4$.

The M/E ratio should not be too high as otherwise the polyester may be absorbed to a large extent by the polyethylene phase leaving less polyester available to serve as compatibiliser at the interface of the polyethylene and polypropylene phases. Accordingly it is preferred that the M/E ratio is at most 32. Hence the M/E ratio is preferably from 10-32, more preferably from 12-24.

The molecular weight of the polyester may vary and is generally selected such that a material is obtained that can be blended with the polyethylene relatively easily.

The number average molecular weight is preferably from 5000 to 250000 g/mol, more preferably from 10000 to 100000 g/mol, said number average molecular weight being determined as the polyethylene-equivalent molecular weight by high temperature size exclusion chromatography performed at 160° C. in trichlorobenzene using polyethylene as standard.

Polyester—Method

The polyester may be manufactured by various methods known in the art.

For example, the polyesters may be prepared by enzymatic ring-opening polymerization, catalytic ring-opening polymerization using organic catalysts, (3) anionic ring-opening polymerization and catalytic ring-opening polymerization using metal-based catalysts, (4) ADMET (acyclic diene metathesis) or ROMP (ring-opening metathesis) of ester containing dienes or unsaturated cyclic esters, respectively or (5) polycondensation.

Ezymatic ring-opening polymerization of cyclic esters, in particular macrolactones (lactones with a ring size larger than 10 atoms) has proven to be a very efficient process. For example Novozyme 435, containing supported *Candida Antarctica* lipase B can polymerize pentadecalactone within 2 h at 70° C. with over 90% conversion to high molecular weight ($M_n$ 86,000 g/mol) polypentadecalactone (Bisht, K. S.; Henderson, L. A.; Gross, R. A.; Kaplan, D. L.; Swift, G. *Macromolecules* 1997, 30, 2705-2711; Kumar, A.; Kalra, B.; Dekhterman, A.; Gross, R. A. *Macromolecules* 2000, 33, 6303-6309). Supported *Humicola insolenscutinase* gave comparable results for pentadecalactone polymerization (Hunson, M.; Abul, A.; Xie, W.; Gross, R. *Biomacromolecules* 2008, 9, 518-522).

Organic catalysts such as 1,5,7-triazabicyclo[4.4.0]dec-5-ene (TBD) selectively ring-open lactones and macrolactones such as pentadecalactone to the corresponding homo and copolymers. Although the conversions are high, in all reported cases the obtained molecular weights of the products remain relatively low (Bouyahyi, M.; Pepels, M. P. F.; Heise, A.; Duchateau, R. *Macromolecules* 2012, 45, 3356-3366).

The most well-known route to produce high molecular weight polymacrolactones and lactone-macrolactone copolymers is by anionic or catalytic ring-opening polymerization using metal-based catalysts. A wide variety of catalysts have been applied. Aluminum salen (WO 2012/065711, van der Meulen, I.; Gubbels, E.; Huijser, S.; Sablong, R.; Koning, C. E.; heise, A.; Duchateau, R. *Macromolecules* 2011, 44, 4301-4305) and zinc phenoxyimine (WO 2014/188344; Bouyahyi, M.; Duchateau, R. *Macromolecules* 2014, 47, 517-524; Jasinska-Walc, L.; Hansen, M. R.; Dudenko, D.; Rozanski, A.; Bouyahyi, M.; Wagner, M.; Graf, R.; Duchateau, R. *Polym. Chem.* 2014, 5, 3306-3320) catalysts are among the most active catalysts known for the ring-opening polymerization of macrolactones producing high molecular weight homo- and copolymers. Besides discrete catalysts consisting of a complex ancillary ligand system, simple metal alkoxides can also be applied. For example KOtBu and Mg(BHT)$_2$THF$_2$ proved to be potent catalysts/initiators for the ring-opening polymerization of lactones and macrolactones (Jedlinski, Z.; Juzwa, M.; Adamus, G.; Kowalczuk, M.; Montaudo, M. *Macromol. Chem. Phys.* 1996, 197, 2923-2929; Wilson, J. A.; Hopkins, S. A.; Wright, P. M.; Dove, A. P. *Polym. Chem.* 2014, 5, 2691-2694; Wilson, J. A.; Hopkins, S. A.; Wright, P. M.; Dove, A. P. *macromolecules* 2015, 48, 950-958).

ADMET and ROMP are interesting methodologies to produce polyesters with high M/E values. The difference between ADMET and ROMP is that the first is a step growth process whereas the latter is a chain growth process. Though, but methods have resulted in polyesters with a significantly high molecular weight. The disadvantage of olefin metathesis is that to obtain the final saturated product, a hydrogenation step is necessary. The process is also rather costly (Fokou, P. A.; Meier, M. A. R. *Macromol. Rapid. Commun.* 2010, 31, 368-373; Vilela, C.; Silvestre, A. J. D.; Meier, M. A. R. *Macromol. Chem. Phys.* 2012, 213, 2220-2227; Pepels, M. P. F.; Hansen, M. R.; Goossens, H.; Duchateau, R. *Macromolecules* 2013, 46, 7668-7677).

Polycondensation of ω-hydroxy fatty acids or ω-hydroxy fatty acid esters has been reported using either enzymes or metal-based catalysts. For example *Candida Antarctica* lipase B (Novozyme 435) polymerizes ω-hydroxy fatty acids, such as 12-hydroxydodecanoic acid, albeit that degrees of polymerization remain rather low (Mahapatro, A.; Kumar, A.; Gross, R. A. *Biomacromolecules* 2004, 5, 62-68). The same enzyme was also used to copolymerize fatty acid-based diacids with diols to moderately high molecular weight polyesters (Yang, X.; Lu, W.; Zhang, X.; Xie, W.; Cai, M.; Gross, R. A. *Biomacromolecules* 2010, 11, 259-268). The titanium-catalyzed polycondensation of ω-hydroxy fatty acid esters proved to be highly efficient resulting in high molecular weight polyesters (Liu, C.; Liu, F.; Cai, J.; Xie, W.; Long, T. E.; Turner, S. R.; Lyons, A.; Gross, R. A. *Biomacromolecules* 2011, 12, 3291-3298).

Methods for making polyesters suitable for application in the present invention are further disclosed for example in WO 2012/065711, WO 2014/203209, WO 2014/147546, the contents of which are incorporated herein by reference.

Block Copolymer Compatibiliser

Polyester Block

The polyester block in the compatibiliser of the composition according to the present invention is a non-aromatic polyester having an average M/E ratio of at least 10, wherein M is the number of backbone carbon atoms in the polyester not including the carbonyl carbons and E is the number of ester groups in the polyester. With average M/E ratio is meant a numerical average. The M/E ratio may also be at least 12, at least 20, at least 50 or even at least 100. It is however advantageous for printability to find a balance between on the one hand the interaction with the polyethylene phase and sufficient introduced polarity into the material. Accordingly it is preferred that the M/E ration is at most 50, preferably at most 32. Hence a preferred range for the M/E ratio in the polyester block is from 10-32.

The polyester is non-aromatic meaning the polyester does not contain aromatic groups.

The backbone of the polyester is preferably saturated meaning it preferably does not contain any double bonds. It is preferred the backbone of the polyester is aliphatic.

The polyester backbone may, in an embodiment, contain short aliphatic branches such as methyl, ethyl, propyl, butyl, pentyl or hexyl branches. The amount of such branches is preferably kept at a low amount since it may negatively affect the (co)crystallisation behaviour of the polyester block. In another embodiment the backbone contains one or more heteroatoms such as oxygen, nitrogen or sulfur. It is preferred that the backbone of the polyester is based on methylene units, i.e. that the ester groups are linked via unbranched aliphatic groups.

The polyester may be a polyester homopolymer or a polyester copolymer.

If the polyester is a polyester copolymer then the number of backbone carbon atoms between two neighboring ester groups in the backbone is preferably randomly distributed over the polyester. Furthermore the number of backbone carbon atoms (M) between ester functionalities in polyester copolymers is preferably at least 8, more preferably at least 10, or at least 12.

Typical examples of polyester homopolymers include the hompolymers obtainable by the ring opening polymerisation of dodecalactone, tridecanolactone, tetradecalactone, pentadecalactone, hexadecalactone, heptadecalactone, octadecalactone, nonadecalactone, ambrettolide, globalide. In other words typical examples of polyester homopolymers include polydodecalactone, polytridecanolactone, polytetradecalactone, polypentadecalactone, polyhexadecalactone, polyheptadecalactone, polyoctadecalactone, polynonadecalactone, polyambrettolide, polyglobalide.

Typical examples of polyester copolymers include copolymers of at least two lactones from a group including dodecalactone, tridecanolactone, tetradecalactone, pentadecalactone, hexadecalactone, heptadecalactone, octadecalactone, nonadecalactone, ambrettolide, globalide, valerolactone, caprolactone, massoia lactone, δ-decalactone, ε-decalactone, 13-hexyloxacyclotridec10-en-2-one, 13-hexyloxacyclotridecan-2-one.

Other typical examples of polyester copolymers include AABB type copoly esters prepared of a combination of $C_2$-$C_{30}$ diols and $C_2$-$C_{32}$ diacids provided the polyester copolymer has an average M/E of at least 10. Further it is preferred that the M/E ratio for the copolymers is at least 8. The term $C_x$ refers to the amount of carbon atoms x in the diol or diacid respectively.

Diols include, but are not limited to, ethylene glycol, propane-1,3-diol, butane-1,4-diol, pentane-1,5-diol, hexane-1,6-diol, heptane-1,7-diol, octane-1,8-diol, nonane-1,9-diol, decane-1,10-diol, undecane-1,11-diol, dodecane-1,12-diol, tridecane-1,13-diol, tetradecane-1,14-diol, epntadecane-1,15-diol, hexadecane-1,16-diol, heptadecane-1,17-diol, octadecane-1,18-diol, nonadecane-1,19-diol, icosane-1,20-diol, henicosane-1,21-diol, docosane-1,22-diol, tricosane-1,23-diol, tetracosane-1,24-diol, pentacosane-1,25-diol, hexacosane-1,26-diol, heptacosane-1,27-diol, octacosane-1,28-diol, nonacosane-1,29-diol, triacontane-1,30-diol as well as their unsaturated and branched analogues. The lactone might also contain a hetero atom in the main chain like an oxygen, nitrogen or sulfur—for example 1,5-dioxapan-2-one.

Cyclic carbonic acid esters can also be used as monomer or as comonomer in combination with lactones, dilactones, hydroxyl acids, hydroxyacid esters or diols plus dicarboxylic acids or a combination of these monomers to form polycarbonates or poly(ester-co-carbonate)s with an average M/E of 10 or larger. Examples of cyclic carbonic acid esters are trimethylene carbonate and decamethylene carbonate.

Diacids include, but are not limited to oxalic acid, malonic acid, succinic acid, glutaric acid, adipic acid, heptanedioic acid, octanedioic acid, nonanedioic acid, decanedioic acid, undecandedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, icosanedioic acid, henicosanedioic acid, docosanedioic acid, trocosanedioic acid, tetracosanedioic acid, pentacosanedioic acid, hexacosanedioic acid, heptacosanedioic acid, octacosanedioic acid, nonacosanedioic acid, triacontanedioic acid and their unsaturated and branched analogues. The diols and diacids might also contain a heteroatom in the main chain like an oxygen, nitrogen or sulfur.

Instead of a combination of one or more diol and diacid, cyclic dilactones can also be added to produce AABB copolyesters with the desired M/E, which is 10 or higher. Typical examples of cyclic dilactones are: ethylene adipate, ethylene brassylate, butylene adipate.

Another type of polyester copolymers include AB/AABB copolyesters prepared of a combination of lactones and dilactones and/or the combination of $C_2$-$C_{30}$ diols and $C_2$-$C_{32}$ diacids, which result in polyesters having an average M/E of at least 10. The lactones, dilactones, diols and diacids can be selected from the lists given above.

Preferably the polyester or copolyester is selected from polytetradecalactone, polypentadecalactone, polyhexadecalactone, poly(caprolactone-co-pentadecalactone), poly($\varepsilon$-decalactone-co-pentadecalactone), poly(ethylene brassylate-co-pentadecalactone), poly[ethylene-1,19-nonadecanedioate], poly[ethylene-1,23-tricosanedioate], poly[propylene-1,19-nonadecanedioate], poly[propylene-1,23-tricosanedioate], poly[1,4-butadiyl-1,19-nonadecanedioate], poly[1,4-butadiyl-1,23-tricosanedioate], poly[1,6-hexadiyl-1,19-nonadecanedioate], poly[1,6-hexadiyl-1,23-tricosanedioate], poly[1,19-nonadecadiyl-1,19-nonadecanedioate], poly[1,19-nonadecadiyl-1,23-tricosanedioate], poly[1,23-tricosadiyl-1,19-nonadecanedioate], poly[1,23-tricosadiyl-1,23-tricosanedioate], poly[1,20-icosadiyl-1,20-icosa-nedioate], poly[1,6-hexadiyl-1,20-icosenedionate], poly[propylene-1,20-icosanedionate].

More in general the polyester or copolyester is of general structure

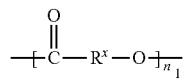

wherein $R^x$ is an organic group, preferably an aliphatic group having an average chain length of at least 10 carbon atoms and $n_1$ is the number of repeating units, which generally is at least 25, preferably at least 50 such as at least 100. The number of repeating units n1 is preferably at most 2000, such as at most 1000 or 500.

Organic group $R^x$ is a branched or straight hydrocarbon group optionally containing one or more heteroatoms provided that the atom neighboring the —O— is a carbon atom, i.e. not a heteroatom. $R^x$ may contain one or more unsaturations, like —C=C—. Preferably $R^x$ is a branched or straight hydrocarbon group, more preferably $R^x$ is a branched or straight aliphatic group. $R^x$ is preferably a saturated aliphatic group. In that respect the term chain length as used herein refers to the shortest number of atoms between two ester functionalities (O=)C—O—. Hence the "chain length" does not include any optional branches or side groups. For example, if $R^x$ is ($C_4H_8$) the chain length is four. Similarly, if $R^x$ is $CH_2$—$C(CH_3)_2$—$CH_2$—$CH_2$ the chain length is also four. In the general formula above Rx may be the same or different throughout the polyester provided the average chain length is at least 10 carbon atoms. The following general (co)polyester structures can be considered, which structures are more detailed embodiments of the general structure provided above:

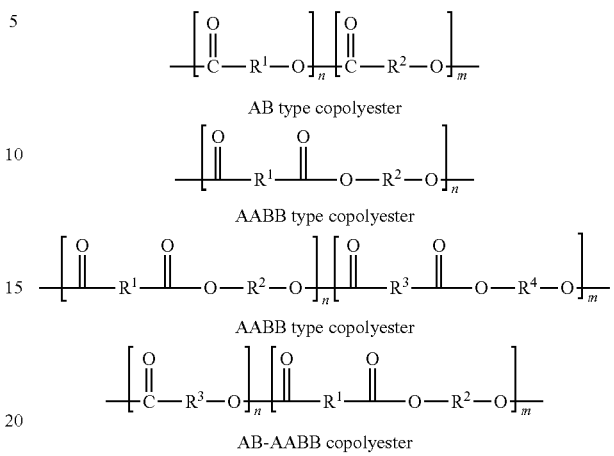

The chain lengths of $R^1$, $R^2$, $R^3$ and $R^4$ are selected such that for the polyester the M/E ratio is at least 10. The description for $R^x$ above also applies for $R^1$-$R^4$.

The average M/E ratio is preferably at least 12. The higher the M/E ratio is the more the polyester will resemble polyethylene and the better the interaction with the polyethylene phase will be. At the same time, the manufacture of polyesters with very high M/E ratio is less cost-effective. In addition the polarity of material will then be lower so that printability requires pre-treatment.

Accordingly the M/E ratio may be at most 32. Hence the M/E ratio is may be from 10-32, more preferably from 12-24.

Polypropylene Block

The polypropylene block in the compatibiliser of the composition according to the present invention is a propylene homopolymer or a propylene copolymer containing at least 90 wt. % of propylene on the basis of the weight of the polypropylene block. Comonomers may be ethylene or C3-C8 α-olefins, preferably ethylene. Preferably the amount of comonomer is at most 5 wt. %, more preferably at most 2 wt. %. If the amount of comonomer is too high the material may become fully amorphous which from a viewpoint of mechanical properties is not desirable in certain applications.

Type of Block Copolymer

The block copolymer according to the present invention is preferably of the type AB or BAB with A representing polypropylene and B representing polyester.

The block copolymer may also be a graft block copolymer of structure $AB_n$ having a polypropylene backbone with n polyester branches grafted thereon, n being at least 1. For graft copolymers the backbone is considered as the polypropylene block.

The amount of grafts n is at most 20, preferably at most 15 or 10. The number of grafts not be too high because otherwise the polypropylene backbone will not interact sufficiently with the polypropylene phase in the composition.

In an embodiment where a block copolymer contains two or more B (i.e. polyester) blocks these B blocks may be the same or different in length, i.e. may have the same or different molecular weight, depending on the conditions of the process to manufacture the block copolymer.

The number average molecular weight of the block copolymer used in the composition as compatibiliser is preferably from 5000 to 250000 g/mol, more preferably from 10000 to 100000 g/mol, said number average molecular weight being determined as the polyethylene-equivalent molecular weight by high temperature size exclusion chromatography performed at 160° C. in trichlorobenzene using polyethylene as standard.

Method of Manufacture: Block Copolymer

In an embodiment the block copolymers can be manufactured by a three-step method.

In a first step (A) propylene and optionally an olefinic comonomer is/are polymerised using a catalyst system to obtain a first polypropylene block containing a main group metal on at least one chain end; the catalyst system comprising:

i) a metal catalyst or metal catalyst precursor comprising a metal from Group 3-10 of the IUPAC Periodic Table of elements; and ii) at least one type of chain transfer agent; and iii) optionally a co-catalyst;

Thus, in step (A) a polypropylene or poly(propylene-co-α-olefin) is being prepared by means of coordinative chain transfer polymerization (CCTP) in the presence of a catalyst, cocatalyst, at least one type of chain transfer agent and optionally an additional chain shuttling agent. Chain transfer agents used are typically aluminum-, boron- and/or zinc hydrocarbyl species). This process results in polypropylene or poly(propylene-co-α-olefin) chains that are end-functionalized with a metal atom, which is susceptible to react with an oxidizing agent such as oxygen.

In a second step (B) the first polypropylene block containing a main group metal on at least one chain end obtained in step A) is reacted with at least one type of oxidizing agent and subsequently at least one type of metal substituting agent to obtain a first polypropylene block containing at least one functionalised chain end. Preferably the functionalised chain end comprises a hydroxyl group.

Thus, during step (B), the product obtained from step (A) is treated with oxygen followed a protic substrate, such as acidified alcohol, to remove the metal, to afford a hydroxyl end-functionalized polypropylene or poly(propylene-co-α-olefin) product.

In a third step (C) at least one second polymer block is formed on the first polypropylene block, wherein as an initiator the functionalized chain end of the first polypropylene block obtained in step B) is used to obtain the block copolymer. The third step can be performed by transesterification or ring opening polymerisation (ROP) of (suitable) lactones.

Thus, in step (C) the product of step (B) is used as a macroinitiator for the formation of the diblock copolymer. During step (C), a ring-opening polymerization of lactones or a transesterification of a pre-synthesized polyester is carried out in the presence of the hydroxyl chain-end functionalized polypropylene or poly(propylene-co-α-olefin) product during step (B) and a ring-opening polymerization and/or transesterification catalyst. Step (C) can be carried out in a (aromatic) hydrocarbon solution or in the melt. The process for the production of polypropylene or poly(propylene-co-α-olefin)-polyester block copolymers, is similar as has been reported for e.g. HDPE-PLLA di block copolymers (*Chem. Eur. J.* 2012, 18, 13974-13978) or for syndiotactic PP-polyester diblock copolymers (*Macromolecules* 2010, 42, 3073-3085). The transesterification reaction is comparable as reported for the coupling of poly(ethylene-co-vinyl alcohol) and polycaprolactone (*Macromol. Mater. Eng.* 2009, 294, 643-650).

The steps A to C described above can thereby also be performed in cascade-like process for example either in the same or in subsequent/connected reactors or vessels, preferably without additional intermediary and/or workup and/or drying and/or purification steps, even more preferred continuously. In a cascade-like process, the polymer preparation can be carried out without a metal-substitution step, for example by hydrolysis. It should be noted that an extruder can also be considered as a reactor in the context of the present invention.

Method of Manufacture: Graft Block Copolymer

The graft block copolymer, i.e. the block copolymer wherein polyester blocks are grafted on or from a polypropylene backbone, can be manufactured by a three-step method.

In a first step (D) at least one first type of olefin monomer and at least one second type of metal-pacified functionalized olefin monomer are copolymerised using a catalyst system to obtain a polypropylene main chain having one or multiple metal-pacified functionalized short chain branches, the catalyst system comprising:

i) a metal catalyst or metal catalyst precursor comprising a metal from Group 3-10 of the IUPAC Periodic Table of elements;

ii) optionally a co-catalyst;

Thus is step (D) propylene is being copolymerized using a pacified hydroxyl functionalized olefin comonomer in the presence of a catalyst and a cocatalyst, similarly as any other catalytic olefin copolymerization, with the difference that the hydroxyl-functionalised olefinic comonomer is pacified by reacting it with an aluminum alkyl such as TiBA prior to the copolymerization.

In a second step (E) the polypropylene main chain having one or multiple metal-pacified functionalized short chain branches obtained in step (D) is reacted with at least one metal substituting agent to obtain a polypropylene main chain having one or multiple functionalized short chain branches; Preferably the functionalised chain end comprises a hydroxyl group.

Thus, during step (E), the protective group is removed by treating the product of step (A) with a protic substrate such as acidified alcohol. The product of step (E) is a random copolymer of propylene and hydroxyl-functionalized olefins, where the hydroxyl functionalities are located in the short chain branches.

In a third step (F) one or more polyester side chains are formed on the polypropylene main chain, wherein as initiators the functionalized short chain branches on the polypropylene main chain obtained in step (E) can be used to obtain the graft copolymer. Step (F) can be performed by transesterification or by ring opening polymerisation (ROP) of (suitable) lactones.

Thus, the product of step (E) is subsequently used in step (F) as a macro-initiator for the formation of graft block copolymer. During step (F), a ring-opening polymerization of lactones or a transesterification of a pre-synthesized polyester is carried out in the presence of the random copolymer of propylene and hydroxyl-functionalized olefins obtained in step (B) and a ring-opening polymerization and/or transesterification catalyst. Step (C) can be carried out in a (aromatic) hydrocarbon solution or in the melt. The process for the production of propylene and hydroxyl-functionalized olefins and polypropylene-graft-polyester block copolymers, is similar as has been reported for e.g.

ethylene and hydroxyl-functionalized olefin copolymerization and subsequent graft copolymer formation (*J. Polym. Sci. Part A Polym. Chem.* 2014, 52, 2146-2154). The transesterification reaction is comparable as reported for the coupling of poly(ethylene-co-vinyl alcohol) and polycaprolactone (*Macromol. Mater. Eng.* 2009, 294, 643-650).

The steps D to F described above can be performed in cascade-like process for example either in the same or in subsequent/connected reactors or vessels, preferably without additional intermediary and/or workup and/or drying and/or purification steps, even more preferred continuously. In a cascade-like process, the polymer preparation can be carried out preferably without a metal-substitution step, for example by hydrolysis. It should be noted that an extruder can also be considered as a reactor in the context of the present invention.

Polypropylene

The polypropylene in the composition may be:
one or more of a propylene homopolymer,
one or more of a propylene-$\alpha$-olefin random copolymer, preferably a propylene ethylene or a propylene $C_4$-$C_8$ $\alpha$-olefin random copolymer,
one or more of a propylene-$\alpha$-olefin block copolymer,
one or more of a heterophasic polypropylene copolymer comprising a matrix phase and a disperse phase, the matrix phase consisting of a propylene homopolymer and/or a propylene copolymer with up to 3 wt. % of ethylene and/or at least one $C_4$-$C_8$ $\alpha$-olefin, the wt. % being based on the matrix phase, and the disperse phase consisting of an ethylene-$C_3$-$C_8$ $\alpha$-olefin copolymer,
a mixture of any of the foregoing polypropylenes.

Isotactic polypropylene is preferred.

If the polypropylene is a heterophasic copolymer it is preferred that the matrix phase is a propylene homopolymer of a propylene-ethylene copolymer with up to 3 wt. % of ethylene and further that the disperse phase is an ethylene propylene copolymer with from 20-80 wt. % of propylene and 80-20 wt. % of ethylene, the wt. % based on the disperse phase.

The polypropylene is preferably a propylene homopolymer or a propylene ethylene or a propylene $C_4$-$C_8$ $\alpha$-olefin random copolymer. The random copolymer contains at most 5 wt. %, on the basis of the copolymer, of said ethylene or $\alpha$-olefin. The random copolymer is preferably a propylene-ethylene random copolymer.

Preferably the melt flow rate of the polypropylene is from 0.1-100 g/10 min as measured in accordance with ISO 1133 (2.16 kg, 230° C.). More preferably the melt flow rate is from 5.0 to 60 g/10 min.

Composition

The amount of compatibiliser in the composition is from 0.1-10 wt. %, preferably from 0.5-10 wt. % such as from 2-10 wt. % or 3-8 wt. % based on the combined weight of the heterophasic polypropylene and the compatibiliser.

The amount of heterophasic polypropylene is preferably at least 80 wt. % such as at least 90 wt. % based on the combined weight of the heterophasic polypropylene and the compatibiliser.

The composition may further contain additives common in the art such as dyes, pigments, antioxidants, ultra-violet stabilisers, infrared absorbers, flame retardants, mould release agents and the like. Such additives are comprised in an amount of up to about 5 wt. % on the basis of the weight of the composition.

The composition may also further comprise reinforcing agents like talc, glass fibres, glass flakes, glass platelets, organic fibres, carbon fibres, cellulosic fibres and the like.

Talc and or glass fibres being preferred. The amount of reinforcing agent may be from 1-30 wt. % on the basis of the weight of the composition. In a preferred embodiment the composition comprises from 1-30 wt. %, more preferably from 2-20 wt. % of talc, based on the weight of the composition.

The melt flow rate of the composition can vary and depends on the intended application. For example the melt flow rate may be from 0.1-100 g/10 min such as from 10-80 g/10 min or from 0.1-3 g/10 min (ISO 1133, 2.16 kg, 230° C.)

The composition may also contain additional elastomers. If these additional elastomers are ethylene copolymers then the amount thereof should be added to the basis for calculation of the amounts of compatibiliser in case these additional elastomers would form a disperse phase, or dissolve in the disperse phase of the (heterophasic) polypropylene.

A skilled person will understand that the composition according to the invention is a thermoplastic composition.

Articles

The present invention further relates to articles comprising the composition as disclosed herein. The present invention further relates to articles manufactured from the composition as disclosed herein. Generally the composition is converted into an article using a moulding technique such as injection moulding, extrusion moulding, blow moulding and compression moulding. Accordingly the present invention also relates to an article obtained by moulding the composition according to the present invention. It is also possible to manufacture profiles or tubes by means of profile or tube extrusion.

In the article obtained by moulding or extrusion a part of the polyester co-crystallised and/or epitaxially crystallised in the ethylene copolymer phase and another part entangled in the polypropylene phase. Alternatively the polyester has entangled with the ethylene copolymer of the disperse phase.

Articles may be automotive interior articles, automotive exterior articles, household appliances and/or.

Use

In a further aspect the present invention relates to the use of a non-aromatic polyester having an average M/E ratio of at least 10 and/or a block copolymer comprising a polypropylene block and a polyester block, said polyester being a non-aromatic polyester and having an average M/E ratio of at least 10, wherein M is the number of backbone carbon atoms in the polyester, not including the carbonyl carbons and E is the number of ester groups in the polyester, as a compatibiliser in heterophasic polypropylene.

In yet a further aspect the present invention relates to the use of a non-aromatic polyester having an average M/E ratio of at least 10 and/or a block copolymer comprising a polypropylene block and a polyester block, said polyester being a non-aromatic polyester and having an average M/E ratio of at least 10, wherein M is the number of backbone carbon atoms in the polyester, not including the carbonyl carbons and E is the number of ester groups in the polyester, as a compatibiliser in heterophasic polypropylene for improving the mechanical properties of said heterophasic polypropylene.

The invention will now be further explained on the basis of the following non-limiting examples.

Polyester Compatibiliser

The present inventors have prepared several compositions of polypropylene, polyethylene and polypentadecalactone and studied the morphology of these blends with electron microscopy.

FIGS. 1-3 show TEM pictures of these blends.

FIG. 1a shows a blend of PP with PPDL in an 80/20 mixture; the black bar at the bottom left of the figure represents 0.2 micrometer.

FIG. 1b shows a blend of PP with PPDL in an 80/20 mixture; the black bar at the bottom left of the figure represents 100 nm.

FIG. 1c shows a blend of PP with PPDL in an 80/20 mixture; the black bar at the bottom left of the figure represents 50 nm.

FIG. 2a shows a blend of LDPE with PPDL in an 80/20 mixture; the black bar at the bottom left of the figure represents 0.2 micrometer.

FIG. 2b shows a blend of LDPE with PPDL in an 80/20 mixture; the black bar at the bottom left of the figure represents 100 nm.

FIG. 2c shows a blend of LDPE with PPDL in an 80/20 mixture; the black bar at the bottom left of the figure represents 50 nm.

FIG. 3a shows a blend of PP and LDPE compatibilised with PPDL in an 80/20/5 mixture; the black bar at the bottom left of the figure represents 0.2 micrometer.

FIG. 3b shows a blend of PP and LDPE compatibilised with PPDL in an 80/20/5 mixture; the black bar at the bottom left of the figure represents 100 nm.

FIG. 3c shows a blend of PP and LDPE compatibilised with PPDL in an 80/20/5 mixture; the black bar at the bottom left of the figure represents 50 nm.

FIG. 1 shows that (see in particular FIG. 1c) at the interface between the PP and the PPDL there is some sort of transitioning from one phase to the other, indicative for interaction between the two materials.

FIG. 2 shows that (see in particular FIG. 2c) at least part of some crystals (lamella's) in one phase continue in the other phase, which is indicative for either co-crystallisation or for epitaxial crystallisation of the polyester onto the polyethylene.

Figure 4:
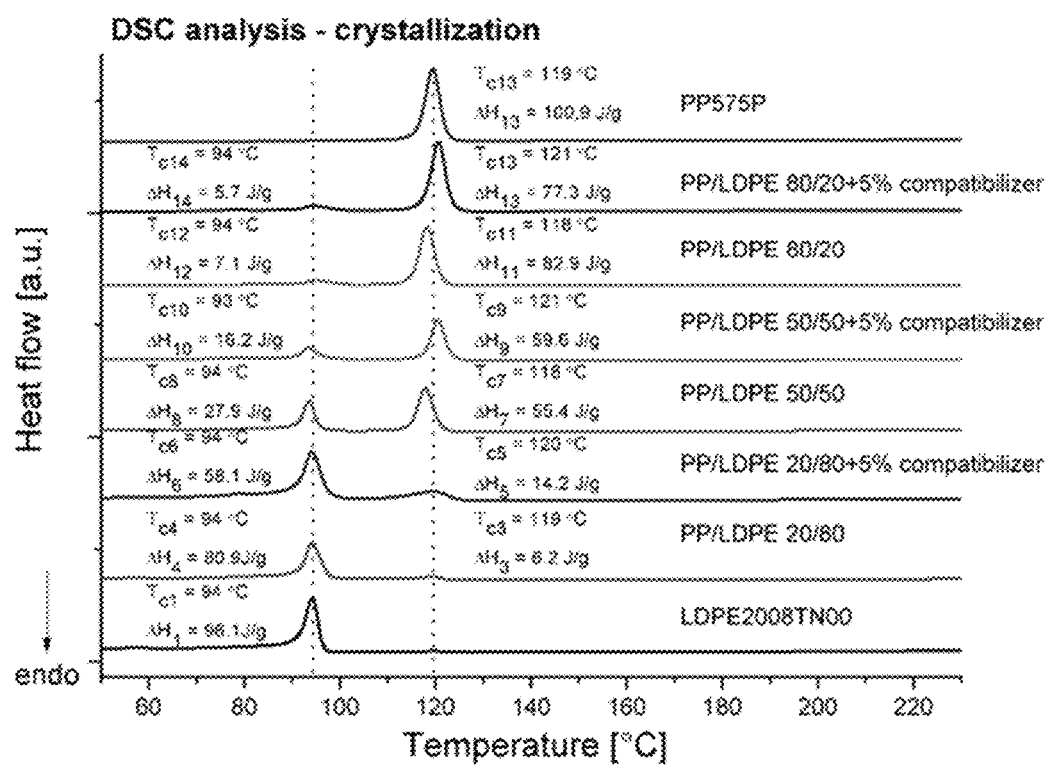
FIG. 4 illustrates DSC plots for the blends set forth in Table 2.

In FIG. 3 the above observations are confirmed in that there is no strict interface between the polypropylene (light colour) and the polyethylene (dark color) phases, but rather that there is a gradual change from one phase to the other. The present inventors believe that this gradual change is the result of the compatibilising effect Based on these observations relating to polypropylene-polyethylene blends the present inventors believe that similar compatibilising effects can be observed for heterophasic polypropylenes based on a polypropylene matrix phase and an ethylene copolymer disperse phase.

Polypropylene-Block-Polyester Compatibiliser

Measurement Methods

Conversion of reactions was determined by NMR:

$^1$H NMR analysis ($^1$H-NMR) carried out at 80-110° C. using deuterated tetrachloroethene (TCE-d$_2$) as the solvent and recorded in 5 mm tubes on a Varian Mercury spectrometer operating at frequencies of 400 MHz. Chemical shifts in ppm versus tetramethylsilane were determined by reference to the residual solvent.

Mn, Mw and PDI:

Mn, Mw (in kg/mol) and PDI were determined by means of high temperature size exclusion chromatography (SEC) which was performed at 160° C. using a high speed GPC (Freeslate, Sunnyvale, USA). Detection: IR4 (PolymerChar, Valencia, Spain). Column set: three Polymer Laboratories 13 μm PLgel Olexis, 300×7.5 mm. 1,2,4-Trichlorobenzene (TCB) was used as eluent at a flow rate of 1 mL·min$^{-1}$. TCB was freshly distilled prior to use. The molecular weights and the corresponding PDI were calculated from HT SEC analysis with respect to narrow polyethylene standards (PSS, Mainz, Germany). Size exclusion chromatography (SEC) of block copolymers was performed at 160° C. on a Polymer Laboratories PLXT-20 Rapid GPC Polymer Analysis System (refractive index detector and viscosity detector) with 3 PLgel Olexis (300×7.5 mm, Polymer Laboratories) columns in series. 1,2,4-Trichlorobenzene was used as eluent at a flow rate of 1 mL*min$^{-1}$. The molecular weights were calculated with respect to polyethylene standards (Polymer Laboratories). A Polymer Laboratories PL XT-220 robotic sample handling system was used as autosampler. Polydispersity, PDI, corresponds to $M_w/M_n$.

Melting ($T_m$) and crystallization ($T_c$) temperatures as well as enthalpies of the transitions were measured by differential scanning calorimetry (DSC) using a DSC Q100 from TA Instruments. The measurements were carried out at a heating and cooling rate of 10° C.·min$^{-1}$ from −60° C. to 210° C. The transitions were deduced from the second heating and cooling curves.

Preparation of Polypropylene Block Having a Hydroxyl-Functionalized Chain End

The polymerization was carried out in a stainless steel stirred reactor having a reaction volume of 300 mL. The reactor was kept at a constant temperature of 40° C. Toluene (70 mL) and methylalumoxane (MAO) solution (5 mL of 30% solution in toluene, Al/Zr≈1000) were added and stirred at 50 rpm for 30 min. Triisobutylaluminium (TIBA; 4 mL, 1.0 M solution in hexanes, Al/Zr≈200 equiv.) and di-ethyl-zinc (DEZ; 1.0 mL, 1.0 M solution in hexanes, Al/Zr≈50 equiv.) were added and stirred for 10 min. Then a toluene solution of the zirconocene catalyst precursor, rac-Me$_2$Si(2-Me-4-Ph-Ind)$_2$ZrCl$_2$, was added. The solution was saturated with a predefined pressure of olefin—either ethylene or propylene. In a glove box, the catalyst was dissolved in toluene (3 mL) and transferred into the reactor. The reactor was then pressurized to the desired pressure (2 bars) of olefin and the pressure was maintained for a predefined time (15 min, step A)). At the end of polymerization, the olefin feed was stopped and after releasing the residual olefin pressure, air was injected through a gas injection tube and the suspension was maintained under constant oxygen pressure of 3 bars at 60° C. for 2 h with rigorous stirring (600 rpm, step B). At the end of oxidation step, the polymer was quenched in acidified methanol (used as metal substituting agent, step B)) to obtain the hydroxyl-functionalized first polypropylene block (iPP) that is then filtered, washed with methanol and dried at 60° C. in vacuum overnight.

The examples below relate to step C) of the process as described herein, wherein a second polymer block is formed using a previously prepared first polypropylene block having a functionalized chain end, especially for example a hydroxyl functionalized chain end.

Preparation of Block Copolymers

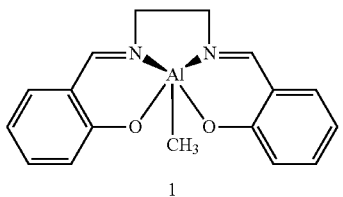

Catalyst 1

1

-continued

Catalyst 2

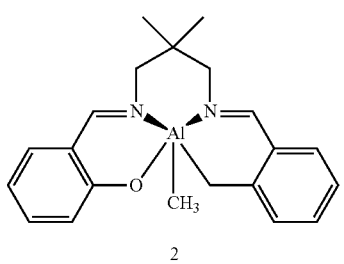

2

Catalyst 3

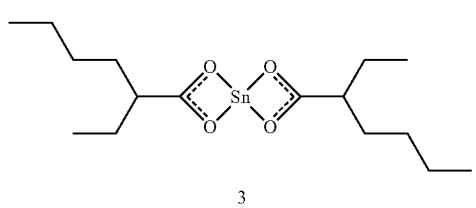

3

EXAMPLE 1

Typical Procedure for Synthesis of iPP-Block-PPDL Copolymers Via cROP.

A glass crimp cap vial was charged with toluene (1.5 mL), PDL (1.08 g, 4.5 mmol), hydroxyl end-capped iPP (17.4 mg, 8.7 μmol) and catalyst 2 (3.05 mg, 8.7 μmol).

All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 1, entries iPP-PPDL1-iPP-PPDL9 specify the reaction conditions, molecular weight ($M_n$ and $M_w$), PDI and the PDL conversion.

EXAMPLE 2

The same procedure was used as for example 1, with this difference that 2 was premixed with the hydroxyl end-capped iPP for 24 h at 100° C. Table 1, entries iPP-PPDL10-iPP-PDL15 specify the reaction conditions, molecular weight ($M_n$ and $M_w$), PDI and the PDL conversion.

EXAMPLE 3

The same procedure was used as for example 2, with this difference that 1 was premixed with the hydroxyl end-capped iPP for 24 h at 100° C. Table 1, entries iPP-PPDL16-iPP-PDL21 specify the reaction conditions, molecular weight ($M_n$ and $M_w$), PDI and the PDL conversion.

EXAMPLE 4

Typical procedure for synthesis of PP-block-PPDL via reactive extrusion. The extruder temperatures of chambers were set at 160° C., 180° C., 190° C. in the first, second and third zone, respectively. The extruder was fed with maleic anhydride functionalized iPP (Exxelor PO1020, 9 g, $M_n$=30.7 kg·mol$^{-1}$, PDI=3.4, 0.43 wt % of anhydride groups) and Irganox B225 (2500 ppm). Polymer was pre-mixed for 5 minutes and subsequently the ethanolamine (0.072 g, 1.1 mmol) was added via syringe. The mixture was processed for 60 s and then the extruder chamber was evacuated. The OH-functionalized polypropylene (Exx-OH) was purified by dissolution in m-xylene at 120° C. and precipitation in a cold acetone. The product was dried in a vacuum oven for 24 h at 40° C.

The previously prepared OH-functionalized PP was utilized for the preparation of PP-block-PPDL copolymers. In this step the extruder was fed with OH-functionalized polypropylene (Exx-OH) (5.1 g, $M_n$=36.6 kg·mol$^{-1}$, PDI=3.4) and polypentadecalactone (PPDL) (3.9 g, $M_n$=115.1 kg·mol$^{-1}$, PDI=2.4) at 190° C. with a screw speed set at 100 rpm. The polymers were premixed for 5 minutes. Then the tin (II) octoate catalyst 3 (0.045 g, 0.1 mmol) was added and the mixture was mixed for 2 minutes. The copolymer was purified by dissolution in m-xylene at 120° C. and precipitation in a cold acetone. The copolymer was dried in a vacuum oven for 24 h at 40° C. Table 1, entries iPP-PPDL22-iPP-PPDL24 specify the reaction conditions, molecular weight ($M_n$ and $M_w$), PDI and the PDL conversion.

EXAMPLE 5

Typical procedure for synthesis of iPP-block-PPDL copolymers via transesterification in the solution. The OH-functionalized polypropylene (Exx-OH) (6.66 g, $M_n$=36.6 kg·mol$^{-1}$, PDI=3.4) and PPDL (3.33 g, $M_n$=39.6 kg·mol$^{-1}$, Đ=2.4) were placed in a three-necked round bottom flask equipped with a nitrogen inlet, reflux condenser and dissolved in m-xylene at 120° C. The solution was stirred using a magnetic stirrer. Then the catalyst 3 (0.05 g, 0.12 mmol) was added and the mixture was stirred for 24 h. The solution was poured into a beaker with cold acetone and stirred using magnetic stirrer for one hour and subsequently filtered. The copolymer was dried in a vacuum oven for 48 h at room temperature. Table 1, entries iPP-PPDL25-iPP-PPDL26 specify the reaction conditions, molecular weight ($M_n$ and $M_w$), PDI and the PDL conversion.

TABLE 1

Ring-opening polymerization of PDL initiated by hydroxyl-end capped iPP affording iPP-block-PPDL copolymers.

| Entry | Cat. | PDL/cat/in | time [h] | temperature [° C.] | $M_n$ [g/mol] | $M_w$ [g/mol] | PDI | conv. [%] |
|---|---|---|---|---|---|---|---|---|
| iPP-PPDL1 | 2 | 250/1/1 | 2 | 100 | 57906 | 107022 | 1.9 | 49 |
| iPP-PPDL2 | 2 | 250/1/1 | 5 | 100 | 35991 | 70338 | 2.0 | 77 |
| iPP-PPDL3 | 2 | 500/1/1 | 2 | 100 | 8786 | 17591 | 2.0 | 18 |
| iPP-PPDL4 | 2 | 500/1/1 | 5 | 100 | 63193 | 122632 | 1.9 | 68 |
| iPP-PPDL5 | 2 | 250/1/1 | 24 | 100 | 60365 | 98079 | 1.6 | 95 |
| iPP-PPDL6 | 2 | 500/1/1 | 24 | 100 | 82483 | 149488 | 1.8 | 90 |

TABLE 1-continued

Ring-opening polymerization of PDL initiated by hydroxyl-end capped iPP affording iPP-block-PPDL copolymers.

| iPP-PPDL7   | 2 | 1000/1/1   | 24 | 100 | 102906 | 187201 | 1.8 | 91 |
| iPP-PPDL8   | 2 | 500/1/1.2  | 24 | 100 | 64643  | 124188 | 1.9 | 86 |
| iPP-PPDL9   | 2 | 1000/1/1.2 | 24 | 100 | 2728   | 15206  | 5.6 | 10 |
| iPP-PPDL10* | 2 | 250/1/1    | 2  | 100 | 7301   | 23323  | 3.2 | 38 |
| iPP-PPDL11* | 2 | 500/1/1    | 2  | 100 | 4860   | 14339  | 3.0 | 39 |
| iPP-PPDL12* | 2 | 1000/1/1   | 2  | 100 | 5203   | 18039  | 3.5 | 22 |
| iPP-PPDL13* | 2 | 250/1/1    | 5  | 100 | 33659  | 64170  | 1.9 | 19 |
| iPP-PPDL14* | 2 | 500/1/1    | 5  | 100 | 38402  | 69637  | 1.8 | 61 |
| iPP-PPDL15* | 2 | 1000/1/1   | 5  | 100 | 54029  | 80752  | 1.8 | 64 |
| iPP-PPDL16* | 1 | 250/1/1    | 2  | 100 | 14321  | 25906  | 1.8 | 32 |
| iPP-PPDL17* | 1 | 500/1/1    | 2  | 100 | 17635  | 29213  | 1.7 | 28 |
| iPP-PPDL18* | 1 | 1000/1/1   | 2  | 100 | traces of product | | | |
| iPP-PPDL19* | 1 | 250/1/1    | 5  | 100 | 33801  | 65196  | 1.9 | 75 |
| iPP-PPDL20* | 1 | 500/1/1    | 5  | 100 | 27246  | 47404  | 1.7 | 38 |
| iPP-PPDL21* | 1 | 1000/1/1   | 5  | 100 | traces of product | | | |

Copolymers synthesized by transesterification/catalyst 3 contribution 0.5 wt %

| Entry | Cat. | PP/PPDL wt/wt | time [h] | temperature [° C.] | $M_n$ [g/mol] | $M_w$ [g/mol] | Đ |
|---|---|---|---|---|---|---|---|
| iPP-PPDL22$^a$ | 3 | 3/5   | 0.03(2 min) | 190 | 35.4 | 168.2 | 4.8 |
| iPP-PPDL23$^a$ | 3 | 4/3   | 0.03(2 min) | 190 | 31.7 | 167.5 | 5.3 |
| iPP-PPDL24$^b$ | 3 | 2/1.5 | 0.03(2 min) | 190 | 30.5 | 207.3 | 6.8 |
| iPP-PPDL25$^c$ | 3 | 2/1   | 24          | 120 | 25.0 | 120.9 | 4.8 |
| iPP-PPDL26$^a$ | 3 | 2/1   | 5           | 120 | 29.9 | 219.7 | 7.4 |

For the reactions marked with * the catalyst was reacted with the initiator at 100° C. for 24 h.
$^a$= $M_n$ of PPDL used in the transesterification process is 85.5 kg/mol,
$^b$= $M_n$ of PPDL used in the transesterification process is 115.1 kg/mol,
$^c$= $M_n$ of PPDL used in the transesterification process is 39.6 kg/mol,

EXAMPLE 6

Typical procedure for the preparation of the uncompatibilized blends. Isotactic polypropylene (iPP) (PP575P, 8.0 g, Mn=42.9 kg·mol$^{-1}$, PDI=6.9, MFI=10.5 g/10 min (230° C., 2.16 kg)), low density polyethylene (LDPE) (2008TN00, 2.0 g, Mn=12.2 kg·mol$^{-1}$, PDI=5.8, MFI=7.5 g/10 min (190° C., 2.16 kg)) were fed into the extruder chamber. The mixture was processed for 3 minutes at 190° C. with a screw rotation rate of 100 rpm. Afterwards the mixture was evacuated directly to a mini-injection molding machine to prepare samples for mechanical properties and morphology analysis. Table 2 entries 1, 2, 4, 6, 8 specify the blends preparation conditions.

EXAMPLE 7

Typical Procedure for the Preparation of the Blends Compatibilized by PP-Block-PPDL.

Isotactic polypropylene (iPP) (PP575P, 8.0 g, Mn=42.9 kg·mol$^{-1}$, PDI=6.9, MFI=10.5 g/10 min (230° C., 2.16 kg)), low density polyethylene (LDPE) (2008TN00, 2.0 g, Mn=12.2 kg·mol$^{-1}$, PDI=5.8, MFI=7.5 g/10 min (190° C., 2.16 kg)) and the PP-block-PPDL (iPP-PPDL24, 0.5 g, $M_n$=30.5 kg·mol$^{-1}$, PDI=6.8) were fed into the extruder chamber. The mixture was processed for 3 minutes at 190° C. with a screw rotation rate of 100 rpm. Afterwards the mixture was evacuated directly to a mini-injection molding machine to prepare samples for mechanical properties and morphology analysis. Table 2 entries 3, 5, 7 specify the blends preparation conditions.

TABLE 2

Composition of the uncompatibilized and compatibilized by PP-block-PPDL polymer blends.

| Entry | Composition | weight ratio [PP]/[LDPE]/ [PP-block-PPDL] | Mixing time [min] |
|---|---|---|---|
| 1 | PP/LDPE/PP-block-PPDL | 100/—/—  | 3 |
| 2 | PP/LDPE/PP-block-PPDL | 80/20/—  | 3 |
| 3 | PP/LDPE/PP-block-PPDL | 80/20/5  | 3 |
| 4 | PP/LDPE/PP-block-PPDL | 50/50/—  | 3 |
| 5 | PP/LDPE/PP-block-PPDL | 50/50/5  | 3 |
| 6 | PP/LDPE/PP-block-PPDL | 20/80/—  | 3 |
| 7 | PP/LDPE/PP-block-PPDL | 20/80/5  | 3 |
| 8 | PP/LDPE/PP-block-PPDL | —/100/—  | 3 |

For the preparation of the blends PP-block-PPDL (entry iPP-PPDL24, Table 1) as the compatibilizer was used.

FIG. 4 shows the DSC plots for these blends. It can be observed that the heat of crystallisation (enthalpy values) for compatibilised blends is lower as compared to blends that are not compatibilised. This is true for both the polypropylene phase as well as the polyethylene phase. Based on these observations the present inventors believe that the block copolymer as disclosed herein indeed has a compatibilising effect on blends of polyethylene and polypropylene.

The invention claimed is:
1. A composition comprising
a heterophasic polypropylene containing i) a matrix phase of a propylene homopolymer and/or a propylene copolymer with up to 3 wt. % of ethylene and/or at least one $C_4$-$C_8$ α-olefin, the wt. % based on the weight of the copolymer and ii) a disperse phase of an ethylene-$C_3$-$C_8$ α-olefin copolymer, wherein the ethylene content is at least 40 wt. % based on the weight of the ethylene-$C_3$-$C_8$ α-olefin copolymer, a compatibiliser, wherein the compatibiliser is i) a non-aromatic polyester having an average M/E ratio of at least 10 and/or ii) a block copolymer comprising a polypropylene block and a polyester block, said polyester being a non-aromatic polyester and having an average M/E ratio of at least 10, wherein M is the number of backbone carbon atoms in the polyester, not including the carbonyl carbons and E is the number of ester groups in the polyester.

2. The composition of claim 1 wherein the polyester has an average M/E ratio of from 12-32.

3. The composition of claim 1 wherein the amount of heterophasic polypropylene is at least 80 wt. % based on the combined weight of the heterophasic polypropylene and the compatibiliser.

4. The composition of claim 1 wherein the amount of polyester is from 0.5-10 wt. % based on the combined weight of the heterophasic polypropylene and the compatibiliser.

5. The composition of claim 1 wherein the compatibiliser is an AB or BAB type block copolymer with A representing polypropylene and B representing polyester, or a graft block copolymer of structure $AB_n$ having a polypropylene backbone with n polyester branches grafted thereon, n being at least 1.

6. The composition of claim 1 wherein in the compatibiliser the polyester is selected from one or more of the group consisting of polytetradecalactone, polypentadecalactone, polyhexadecalactone, poly(caprolactone-co-pentadecalactone), poly(ε-decalactone-co-pentadecalactone), poly(ethylene brassylate-co-pentadecalactone), poly[ethylene-1,19-nonadecanedioate], poly[ethylene-1,23-tricosanedioate], poly[propylene-1,19-nonadecanedioate], poly[propylene-1,23-tricosanedioate], poly[1,4-butadiyl-1,19-nonadecanedioate], poly[1,4-butadiyl-1,23-tricosanedioate], poly[1,6-hexadiyl-1,19-nonadecanedioate], poly[1,6-hexadiyl-1,23-tricosanedioate], poly[1,19-nonadecadiyl-1,19-nonadecanedioate], poly[1,19-nonadecadiyl-1,23-tricosanedioate], poly[1,23-tricosadiyl-1,19-nonadecanedioate], poly[1,23-tricosadiyl-1,23-tricosanedioate], poly[1,20-icosadiyl-1,20-icosanedioate], poly[1,6-hexadiyl-1,20-icosenedionate], poly[propylene-1,20-icosanedionate].

7. The composition of claim 1 wherein the backbone of the polyester is a saturated backbone.

8. The composition of claim 1 wherein the ethylene content of the disperse phase of the heterophasic polypropylene is at least 50 wt. %.

9. The composition of claim 1 further comprising from 1-30 wt. % of an inorganic filler.

10. The composition of claim 1 wherein the composition has a melt flow rate of from 0.1-100 g/10 min, as determined in accordance with ISO 1133 (2.16 kg, 230° C.).

11. An article comprising the composition of claim 1.

12. The article of claim 11, said article being selected from the group consisting of automotive interior articles, automotive exterior articles, household appliances, and pipes.

13. A composition comprising
a heterophasic polypropylene containing i) a matrix phase of a propylene homopolymer and/or a propylene copolymer with up to 3 wt. % of ethylene and/or at least one $C_4$-$C_8$ α-olefin, the wt. % based on the weight of the copolymer and ii) a disperse phase of an ethylene-$C_3$-$C_8$ α-olefin copolymer, wherein the ethylene content is at least 40 wt. % based on the weight of the ethylene-$C_3$-$C_8$ α-olefin copolymer,
a compatibiliser, wherein the compatibiliser is i) a non-aromatic polyester having an average M/E ratio of at least 10 and/or ii) a block copolymer comprising a polypropylene block and a polyester block, said polyester being a non-aromatic polyester and having an average M/E ratio of at least 10, wherein M is the number of backbone carbon atoms in the polyester, not including the carbonyl carbons and E is the number of ester groups in the polyester;
wherein the amount of heterophasic polypropylene is at least 90 wt. % and the amount of polyester is from 5-10 wt. %, based on the combined weight of the heterophasic polypropylene and the compatibilizer.

14. The composition of claim 9 wherein the inorganic filler is talc.

15. The composition of claim 1 wherein the ethylene content of the disperse phase of the heterophasic polypropylene is at least 65 wt. %.

* * * * *